US012806801B2

(12) United States Patent
Rossetti et al.

(10) Patent No.: US 12,806,801 B2
(45) Date of Patent: Nov. 24, 2026

(54) AUTOMATIC STATION COMPRISING A TOOL FOR PROCESSING OF EDIBLE LIQUIDS AND ASSEMBLY METHOD THEREOF

(71) Applicant: MAKR SHAKR SRL, Turin (IT)

(72) Inventors: Emanuele Rossetti, Turin (IT); Dario Pinese, Turin (IT)

(73) Assignee: MAKR SHAKR SRL, Turin (IT)

( * ) Notice: Subject to any disclaimer, the term of this patent is extended or adjusted under 35 U.S.C. 154(b) by 146 days.

(21) Appl. No.: 18/724,821

(22) PCT Filed: Dec. 5, 2022

(86) PCT No.: PCT/IB2022/061761
§ 371 (c)(1),
(2) Date: Jun. 27, 2024

(87) PCT Pub. No.: WO2023/126718
PCT Pub. Date: Jul. 6, 2023

(65) Prior Publication Data
US 2025/0065516 A1 Feb. 27, 2025

(30) Foreign Application Priority Data
Dec. 27, 2021 (IT) ........................ 102021000032669

(51) Int. Cl.
*B25J 15/04* (2006.01)

(52) U.S. Cl.
CPC ................................ *B25J 15/0408* (2013.01)

(58) Field of Classification Search
CPC .................................................... B25J 15/0408
See application file for complete search history.

(56) References Cited

U.S. PATENT DOCUMENTS

2007/0106422 A1* 5/2007 Jennings ................ B25J 9/0084 222/129.1
2023/0322502 A1* 10/2023 Schulnig .............. B65G 47/847 198/470.1

* cited by examiner

*Primary Examiner* — Zoheb S Imtiaz
(74) *Attorney, Agent, or Firm* — Bayramoglu Law Offices LLC

(57) ABSTRACT

A robotic arm for preparing beverages including a gripping mechanism for kitchen articles containing the beverage includes: a first and a second arm movable respectively between an open and a closed position of the arms themselves; said first and second arm being hinged and including respective toothed sectors meshing and rotating about the corresponding hinge axes of the first and second arm; a linear actuator configured to regulate the opening and closing movement of the arms and having a power input adapted to be releasably connected to a power line of a bartender station; wherein the gripping mechanism can be locked to a robotic arm known to perform bartending operations in an automated manner.

9 Claims, 6 Drawing Sheets

AUTOMATIC STATION COMPRISING A TOOL FOR PROCESSING OF EDIBLE LIQUIDS AND ASSEMBLY METHOD THEREOF

CROSS-REFERENCE TO THE RELATED APPLICATIONS

This application is the national phase entry of International Application No. PCT/IB2022/061761, filed on Dec. 5, 2022, which is based upon and claims priority to Italian Patent Application No. 102021000032669, filed on Dec. 27, 2021, the entire contents of which are incorporated herein by reference.

TECHNICAL FIELD

The present invention refers to the sector of robotics applied to the automated handling of a kitchen article such as crockery, for example a glass, of any shape and size containing a drink at the time of handling.

BACKGROUND

It is known that systems and techniques are progressively being developed to automate the process of preparing cocktails and drinks. In other words, real bars are being developed in which the activity of the human operator is replaced by the presence of a machine.

Plants are therefore known which are formed by a series of stations in which, step by step, it is possible to prepare/add elements, both in liquid and solid form, in order to prepare beverages. At the same time systems are known, to be implemented at the various stations, capable of gripping, moving, picking up the individual elements for packaging the beverage itself.

Handling crockery or a kitchen article requires a dose of gripping force and further precautions to avoid damages, e.g. scratches or breaks.

SUMMARY

The object of the present invention is to overcome the shortcomings of the prior art by providing a gripping mechanism for handling a beverage, said beverage being contained inside a kitchen article, for example a glass of any shape and size, including those with a stem, or contained within a cup or even within a small cup. Said glasses, cups and mugs being indifferently made of ceramic, glass or even rigid, non-deformable plastic material.

The object of the present invention is achieved by a gripping mechanism comprising:

- a first and a second arm movable respectively between an open and a closed position of the arms themselves;
- a linear actuator configured to regulate the opening and closing movement of the arms and having a power input adapted to be releasably connected to a power line of the station of a bartender installation;
- a stop for the actuator configured to define the maximum opening position of the arms;
- the first and second arms being hinged and comprising respective toothed sectors which mesh and rotate about the corresponding hinge axes of the first and second arms.

According to a preferred embodiment, said gripping mechanism can be fastened to an end portion of a known robotic arm, by means of a mechanical coupling.

The gripping mechanism according to the present invention, after its assembly on a known robotic arm, makes it possible to handle a kitchen article containing a beverage without the aid of an operator. Said mechanism is also able to dose the gripping force on the kitchen article in such a way as to prevent the latter from breaking if the gripping force were to be too high or alternatively falling to the ground if the grip force is too low. Furthermore, the design of this gripping mechanism allows the figure of the bartender to be replaced even in an automated beverage preparation plant. This gives the further advantage of lowering the management costs of this system.

In a preferred embodiment both the first and the second arm comprise four distinct portions, defining the gripping surfaces of a glass, mug, cup:

- a first curved end portion longitudinally opposed to the toothed sectors, for example for gripping cups of larger diameters such as teacups or mugs. Preferably, each first end portion carries a layer of silicone to increase grip on the cup or glass;
- a second linear portion adjacent to the curved end portion and defining an angle with the latter.

The second linear portion also carries a layer of silicone to increase friction;

- a spacer portion;
- a fourth semicircular portion or with another concave profile on the opposite side to the second linear portion with respect to the spacer portion and configured to house the stem of a glass when said first and said second arm are in the closed configuration outlining a circular profile.

In a further preferred embodiment said gripping mechanism can be configured to be installed on a known robotic arm of an automated station having a tool comprising a releasable mechanical attaching portion for connecting to a movable portion of the automated station; a linear actuator having a power input adapted to be releasably connected to a power line; a container for edible liquids; a movable closure by the linear actuator between a closed position in which the edible liquid is in the container so that, for example, the liquid is stirred by the action of the movable portion and an open position in which the edible liquid is poured into controlled manner out of the container by the action of the movable portion.

BRIEF DESCRIPTION OF THE DRAWINGS

Further objects and advantages of the present invention will become clear from the detailed description that follows of an embodiment of the same (and of its variants) and from the annexed drawings given for purely explanatory and non-limiting purposes, in which.

The same reference numbers in the figures identify the same elements or components.

The elements and features illustrated in the various preferred embodiments, including the drawings, can be combined with each other without however departing from the scope of protection of the present application as described below.

DETAILED DESCRIPTION OF THE EMBODIMENTS

Figure 1:
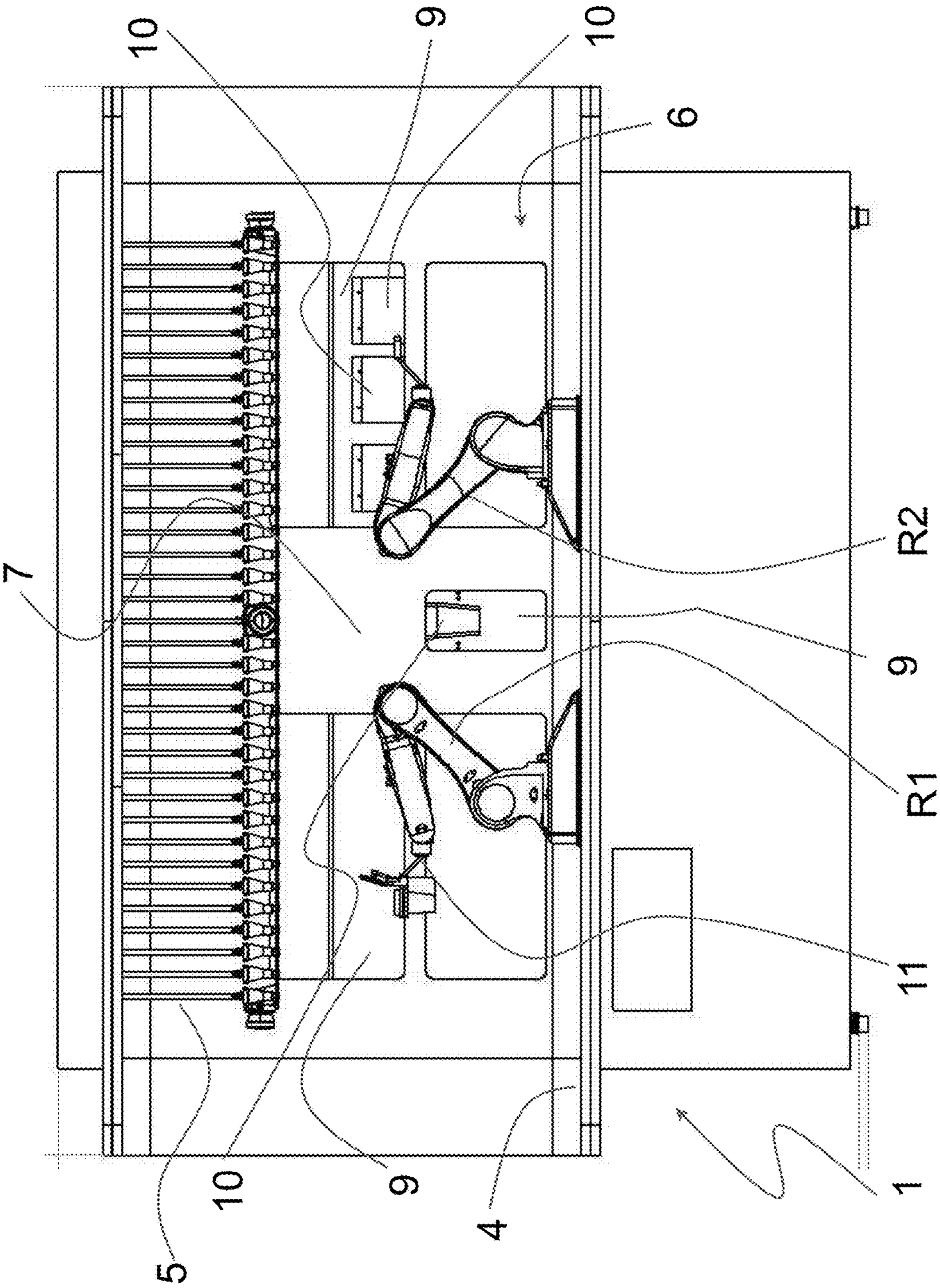
FIG. 1 shows a three-dimensional view of a gripping mechanism (1) in the complete closing configuration of a first arm (2) and of a second arm (3)

Number 1 shows, as a whole, a robotic station comprising a first and a second articulated robotic arm R1, R2 resting on a counter 4. FIG. 1 shows a plurality of supports 5 above the counter 4 to keep bottles of fluids upside down edibles such as ingredients of beverages or drinks. The robotic arms R1, R2 and the counter 4 and are visible from the outside of the robotic station through an open opening 6 which, in the embodiment of FIG. 1, is a through window delimited above and below, being the right and left fully open. In this way the preparation of the food is fully visible to an individual in the vicinity of the robotic station.

On the opposite side of the opening 6 with respect to the robotic arms R1, R2, a partition wall 7 is arranged which delimits the counter 4 and defines a plurality of accesses 9 which one or both of the arms R1, R2 approach during the execution of the procedure of preparing a food. Each access 9 corresponds to a respective functional module 10 comprising an electromechanical or pneumatic device for treating or releasing a food ingredient. Preferably, one or more functional modules 10 further comprise sensors or containers connected to each other together with the electromechanical or pneumatic device to perform a treatment operation of the respective ingredient. For example, the functional modules include slicers, ice grinders, dispensers in particular dispensers of fluid but not liquid or granular ingredients. For example, a fluid but not liquid ingredient is a sauce, paste, cream, whipped cream. Furthermore, some functional modules are provided for performing operations on objects, such as for example a cup dispenser or a washing and disinfection module of an end tool 11 carried by at least one of the robotic arms R1, R2. Preferably further functional modules are arranged in the area below the work surface of the counter 4. The dividing wall 7 and the counter 4 shield from view and/or protect the functional modules 10 from tampering and/or access by unauthorized personnel.

According to the embodiment of the figures, tool 11 is implemented to seal a container and allow bartending operations such as mixing, stirring or the like and will be further described below. Furthermore, the other of the arms R1, R2 carries at its end in a dismountable manner a gripping mechanism 12 for a kitchen article e.g. crockery for the preparation of drinks, such as tea cups, coffee cups and goblets.

Figure 2:
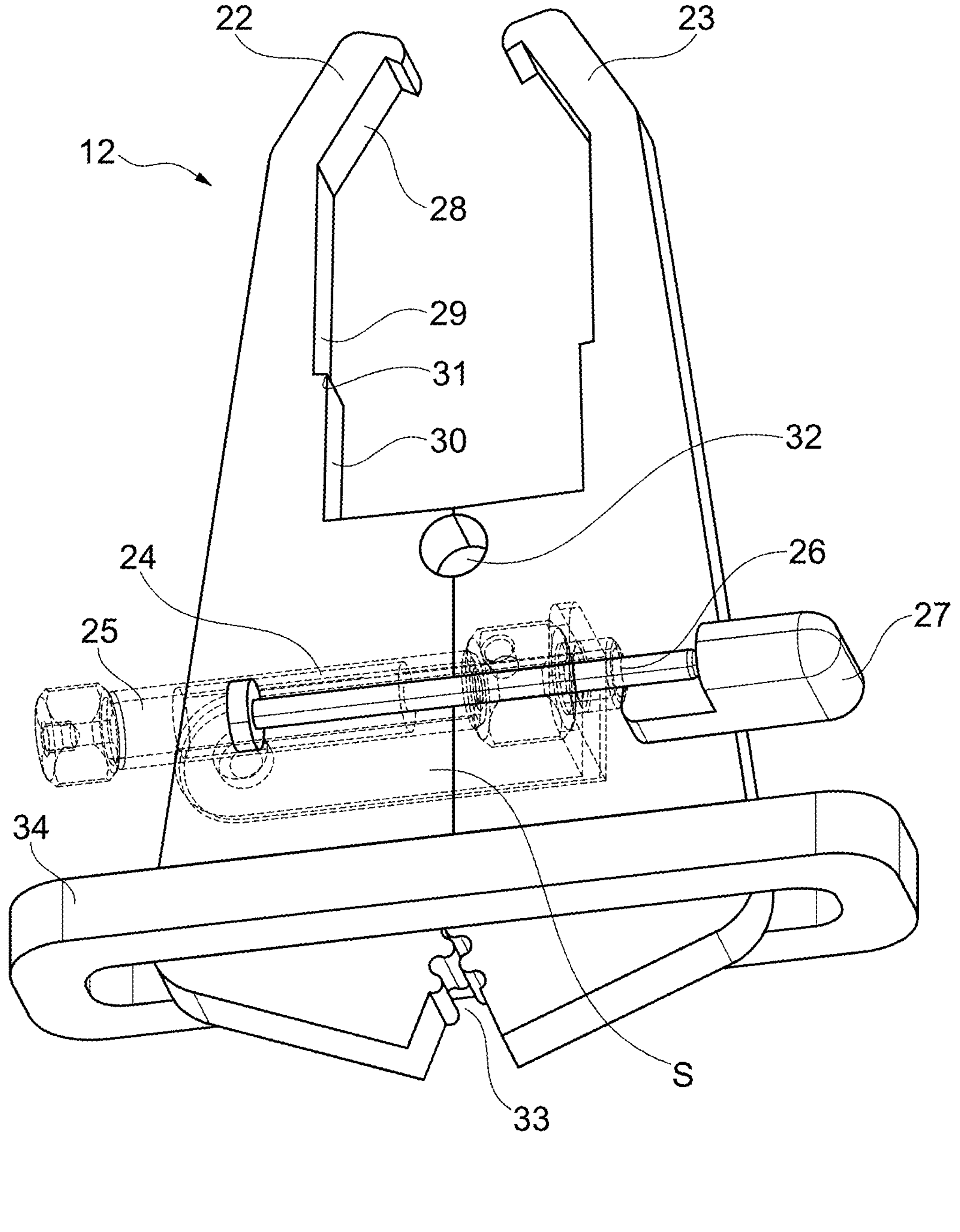
FIG. 2 is a three-dimensional view of the mechanism of FIG. 1 in which the first (2) and second (2) arms are in the semi-open configuration.

FIG. 2 depicts gripping mechanism 12 comprising a first arm 22 and a second arm 23 whose movement from an open configuration to a closed configuration is regulated by a linear actuator, preferably a single actuator 24 releasably connected to a compressed air supply line.

Gripping mechanism 12 is fastened to robotic arm R2, by means of a mechanical coupling placed on one end of the robotic arm itself, to carry out bartending operations in an automated manner. Actuator 24 comprises a sleeve 25 and a stem 26; jacket 5 is connected to first arm 2 preferably by an 'L' shaped bracket S while the stem 66 is connected to the second arm 23 by means of a support 27, preferably a boss.

The 'L' shaped bracket S is placed between sleeve 25 and first arm 22 and, in the closed position of arms 22 and 23, the 'L' shaped bracket is superimposed on second arm 23 so as to protect sleeve 25 from movements of second arm 23 and the related potential friction. Also, bracket S is continuous, i.e. without through openings, to protect actuator 24 from drips of edible liquids, slowing down the wear of the piston. In use, in fact, the piston faces downwards when a filled cup is carried by the caliper.

In FIG. 2 rod 26 is completely housed inside the jacket 25 i.e. first arm 22 and the second arm 23 are in a completely closed configuration.

First arm 22 and second arm 23 comprise gripping surfaces of different shapes and sizes configured to hold a crockery, for example a glass, a cup or even a small cup.

An end portion 28 of each arm 22, 23 is curved inward with an end hook to grip a kitchen article preventing its accidental release. As illustrated in the figure, each arm has a gripping profile in contact with the kitchen article and defined by a plurality of straight segments which start adjacent to actuator 24 and end at end portion 28.

Preferably, a straight segment 29 of the profile is adjacent to end portion 28 and allows the retention of a relatively large container such as a glass, cup having a diameter in the range of 40-110 mm.

A further straight spacer segment 30 of the profile has, with respect to straight segment 29, a recess 31 which allows a layer of silicone (not shown) to be provided on the portions 28 and 29 to increase friction with the glass/cup.

The two arms 22, 23 also identify respective semi-holes 32 so that, when gripping mechanism 1 is in the closed configuration, the relative hole is able to house a stem of a goblet, for example a flute. Each arm 22, 23 comprises, on the longitudinal side opposite the curved end portion, a toothed sector 33. These toothed sectors mesh with each other and rotate around corresponding hinge axes of arms 22, 23 defined by a metal loop 34 which surrounds the arms 2, 3 and defines their respective hinge axes. This loop can be a closed or an open belt. The combination of the toothed sectors 33 and the loop 34 allows the arms 22, 23 to be opened and closed symmetrically with respect to an average axis by means of actuator 24 carried by the arms themselves.

Figure 3:
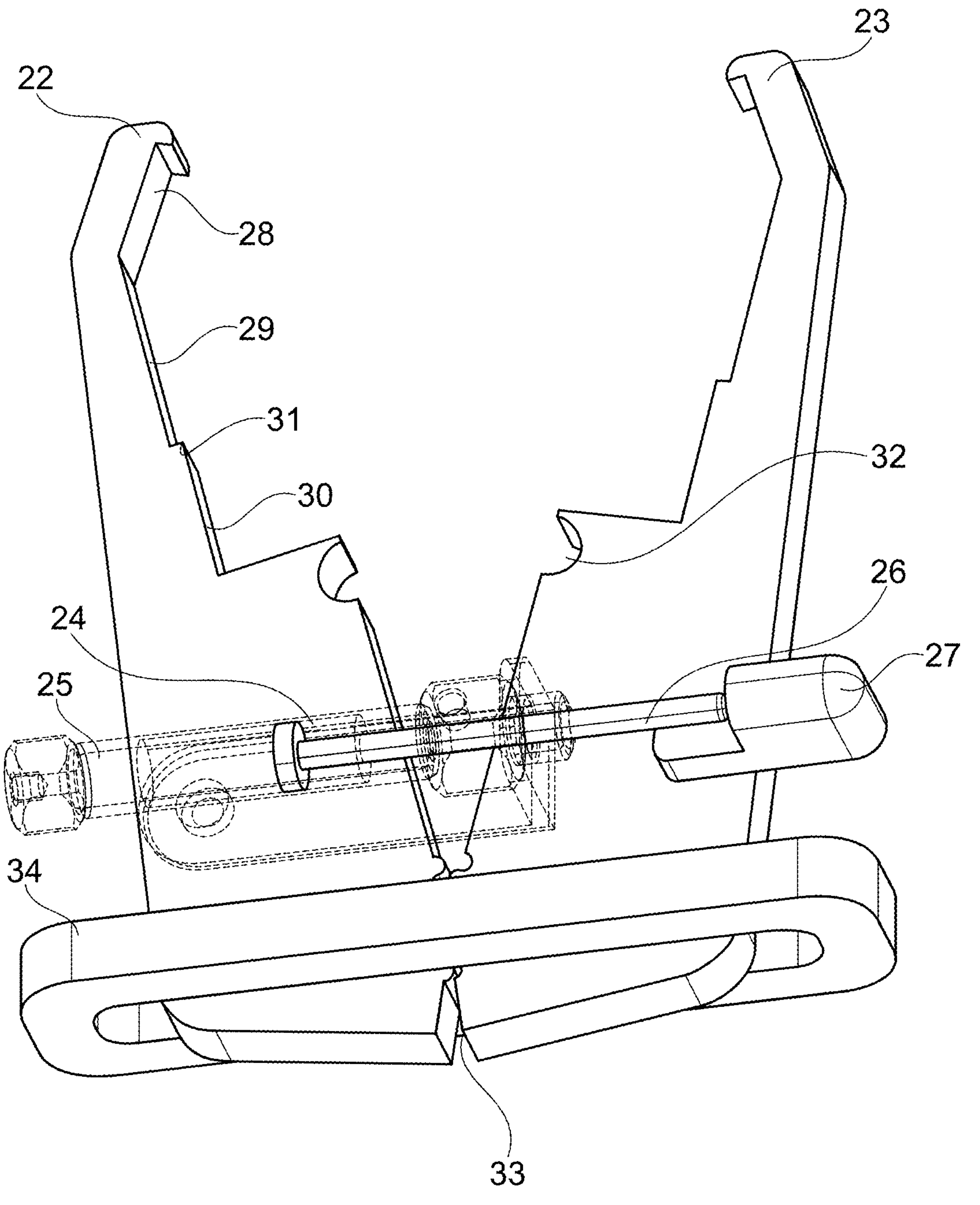
FIG. 3 shows a three-dimensional view of the mechanism of FIG. 1 in which the first (2) and second (2) arms are in the intermediate opening configuration.

FIG. 3 shows the gripping mechanism 1 in which stem 26 is partially extracted from the jacket 25 defining a semi-opening configuration of arms 22, 23. Compared to FIG. 2 in the semi-opening configuration of FIG. 3 the toothed sectors 33 are rotated with respect to the respective hinge axes of the arms.

Figure 4:
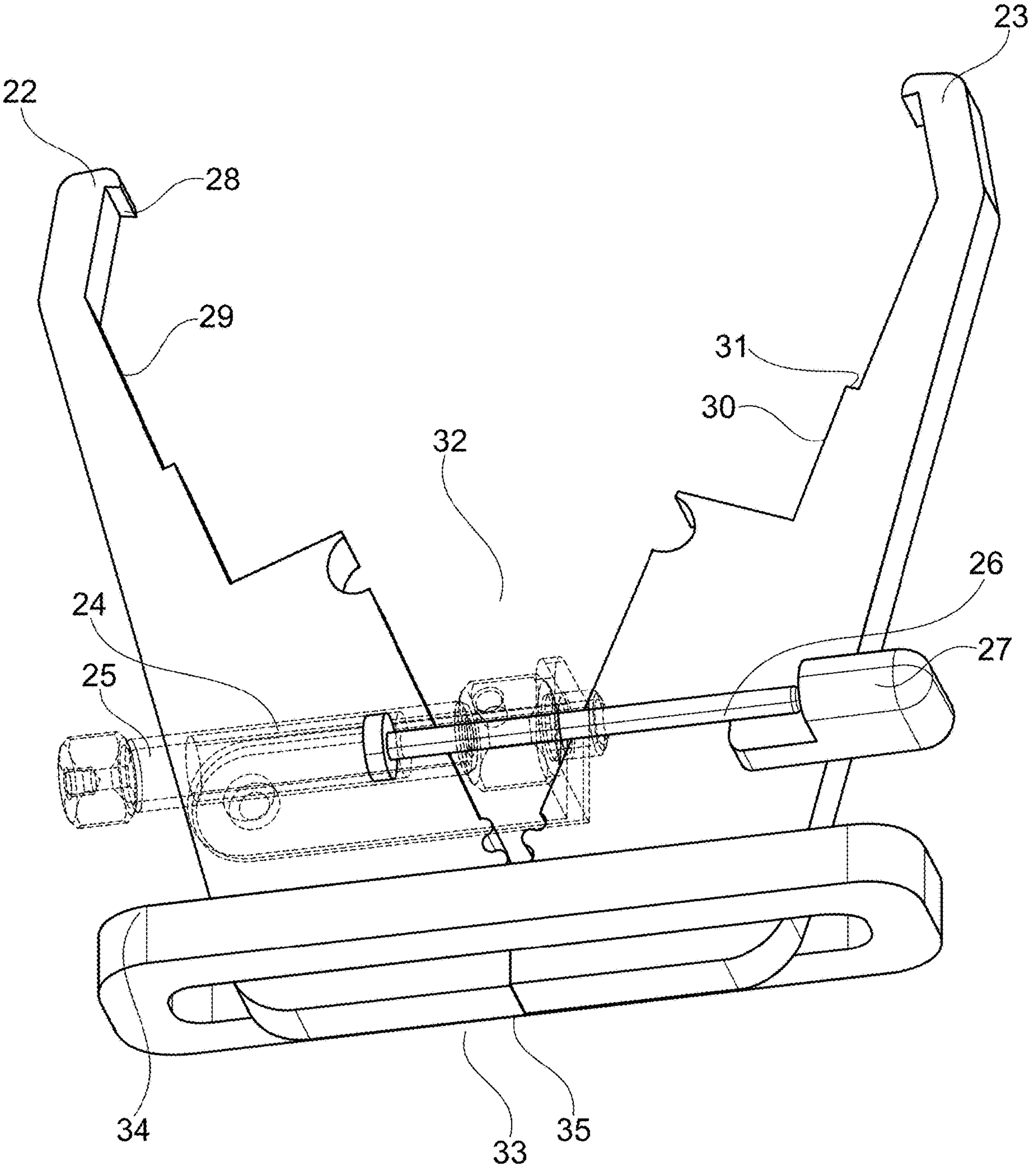
FIG. 4 is a three-dimensional view of the mechanism of FIG. 1 in which the first (2) and second (2) arms are in the maximum opening configuration.

FIG. 4 shows the gripping mechanism 1 in the fully open configuration: at the end of toothed sectors 33, respective abutment stop surfaces 35 are provided which are in contact and establish, through their angular position, the maximum opening of arms 22, 23.

Segments 28, 29, 30, 31 and toothed sectors 33 are configured so as to define a relative distance capable of gripping with segments 28, 29 a container with a diameter between 50 and 60 mm when actuator 4 and segments 29, 30 are perpendicular. This distance identifies an average of the most common cups and mugs and makes it easy to know the load applied by the actuator to the cups/mugs. It should be noted that in this position, which corresponds to a crockery or kitchen article gripping position, at least one, preferably both, segments 29 and 30 are substantially perpendicular to stem 26: in this way, the load of actuator 24 is applied with a substantially unitary correction factor and this makes the actuator particularly efficient and compact.

Figure 5:
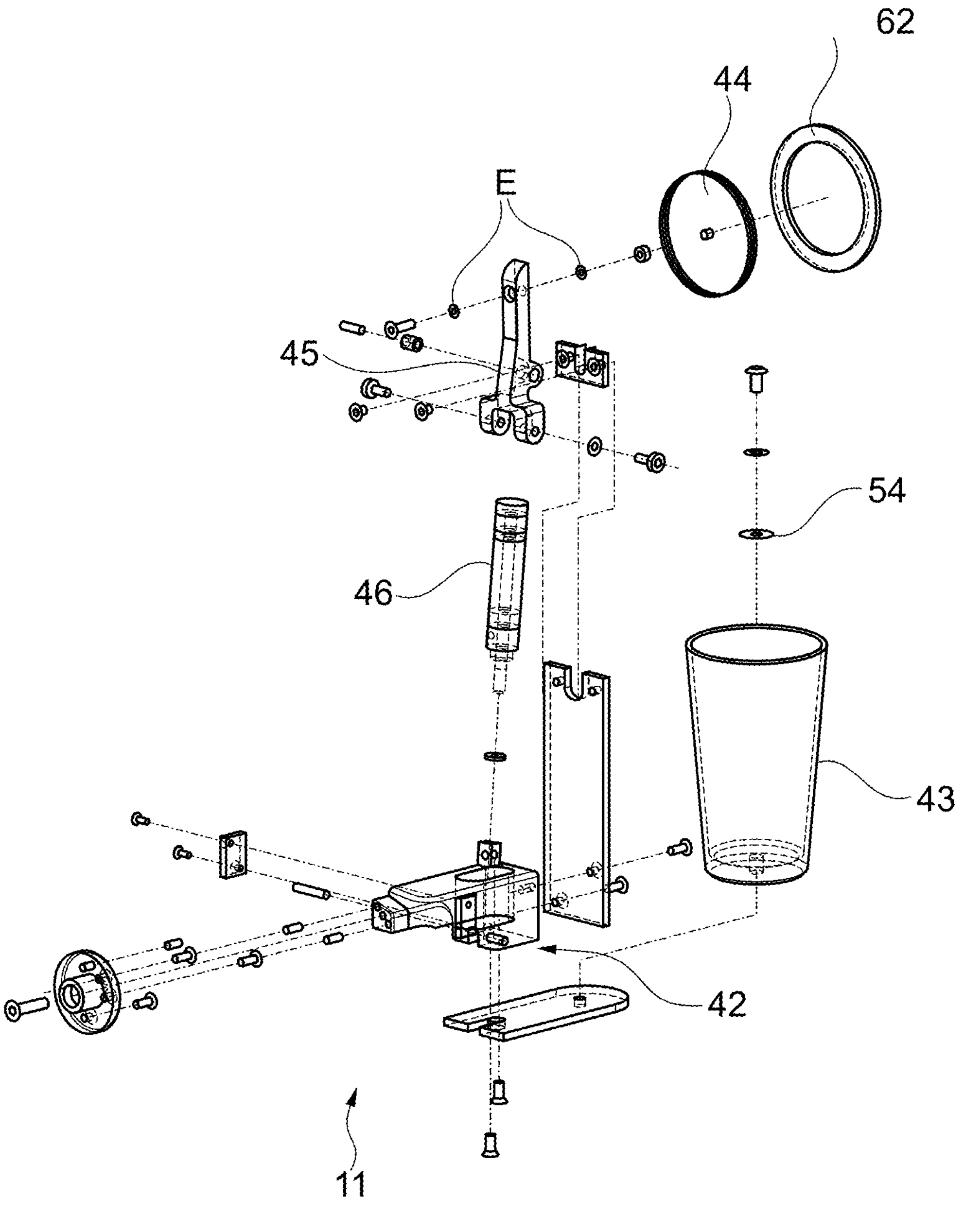
FIG. 5 shows an exploded view of a device which can be joined to the gripper of FIG. 1 as an end effector of a robotic arm, preferably anthropomorphic.

With reference to FIG. 5, tool 11 comprises a support structure 42 releasably connected to a free end portion of the robotic arm R1, a container 43 for edible liquids e.g. cup-shaped and carried by support structure 42, a movable closure 44 for selectively closing container 43, a lever mechanism 45 for moving closure 44 between an open position shown in the figure and a closed position in which the liquid is trapped in container 43 for carrying out one or more bartending operations. The mechanism is actuated by a preferably pneumatic linear actuator 46 and functionally connected to the aforementioned compressed air system of the robotic station.

Figure 6:
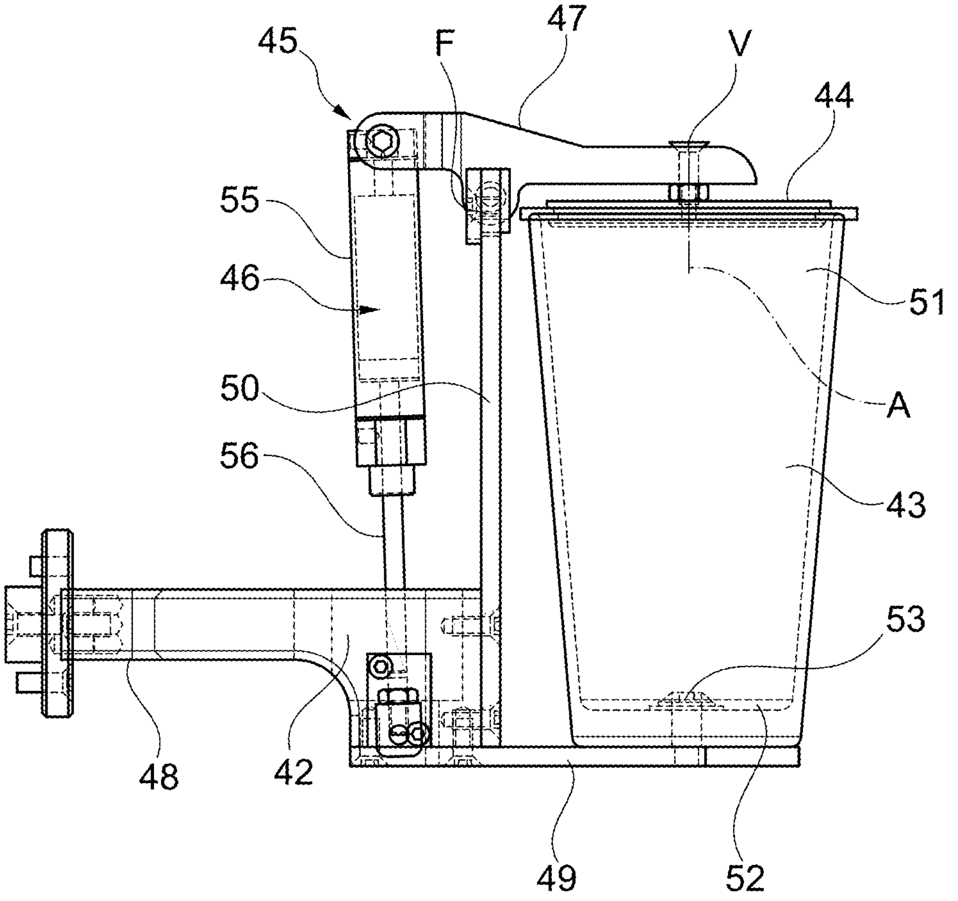
FIG. 6 is a side view of the device of FIG. 5.

Preferably (FIG. 6) mechanism 45 is of unfavorable leverage with respect to the linear actuator 46 i.e. the force of the actuator is multiplied by the geometry of the lever when applied to closure 44. In this regard, the lever mechanism 45 comprises an arm 47 pivoted asymmetrically on the support structure 42 so that a first distance between the fulcrum F and a point of application of force of the linear actuator on the arm is less than a second distance between the fulcrum F and a connection point between the closure 44 and the arm 47. Preferably, support structure 42 has an inverted T shape having a lower left branch 48 configured to connect to the free end portion of robotic arm R1, a lower right branch 49 which carries container 43 and an elongated central body 50 which, on the opposite longitudinal side of branches 48 and 49, defines fulcrum F of lever mechanism 15. From one side of the elongated central body 50, arm 47 carries closure 44 preferably via a connection with at least one degree of freedom so that the closure is movable with respect to the arm in order to be able to best adapt to a leading edge 51 of container 43 when the latter is closed. Even more preferably, the degree of freedom is angular about a substantially transversal axis, preferably perpendicular to that of the closure. According to the embodiment of the figures, an elongated connecting member, e.g. a screw V, is coaxial to the axis A of closure 44 and is housed with radial play in arm 47. This play is preferably closed by one or more elastic elements, e.g. o-ring E (FIG. 5).

Opposed longitudinally to edge 51, container 43 comprises a bottom 52 rigidly connected to lower right branch 49. The connection is releasable and preferably comprises a screw 53 passing through bottom 52 through a hole. In order to avoid liquid leakage through the releasable connection, a fluid seal 54 (FIG. 5) is provided which is activated when the connection is tightened. In the illustrated example, the fluidic seal 54 is an o-ring which is compressed by a head of the screw 53 when the latter is tightened on lower right branch 49. Similarly, it is possible to adapt a bayonet, snap connection, etc. It is also possible that the container has brackets or other projections without any holes and that the container is fixed to body 50 by means of such brackets, e.g. via a shape fit. According to a preferred embodiment, bottom 52 has a hole when container 43 is made of glass or other fragile and transparent material so that at least the level of liquid contained in the container 43 can be seen from the outside. More generally, the container is made of a material having a lower breaking load than that of support structure 42 so that, in the event of an accidental impact, container 43 is damaged, even so as to be unusable, before causing further damage to the structure support and/or an actuation assembly of the robotic arm R1. Via the releasable connection, even an irreparably damaged container 43 can be replaced quickly and cost-effectively.

On the opposite side of container 43 with respect to elongated central body 50, linear actuator 46 is mounted so as to limit or prevent the entry of drops of edible liquid between the moving parts. The actuator comprises a sleeve 55 and a stem 56 removable from the sleeve 55. The actuator can be either fluidic or electromechanical, e.g. rotary motor connected to a rack carried by the rod via a sprocket. As shown in the figures, jacket 55 is connected to mechanism 45 and stem 56 to support structure 42. In this way, when tool 11 is in such a position that leading edge 51 is upwards (FIG. 6), a drop of liquid moves by gravity without penetrating the gap between the stem and the sleeve. According to a potential variant of the invention, a single robotic arm can carry, given the substantially flattened shape of mechanism 12, tool 11 superimposed on mechanism 12. Furthermore, tool 11 can have constructional characteristics different from those illustrated, e.g. container 43 can be closed by means of a lid arranged on a support and having a releasable mechanical connection, for example a slide, to close container 43 in a fluid-tight manner. This lid is applied on and removed from container 43 by the movements of the robotic arm R1, R2 interacting with the support that receives and blocks the lid allowing the robotic arm to disconnect it from the container and, vice versa, keeps the lid still while the robotic arm moves the container to complete the mechanical connection.

What is claimed is:

1. A robotic arm for preparation of beverages, comprising a gripping mechanism for a kitchen article containing the beverage, wherein the gripping mechanism comprises:

a first arm and a second arm respectively movable between an opening and a closing position of the first and second arms;

the first and second arms being hinged and comprising respective toothed sectors meshing and rotating around corresponding hinge axes of the first and second arms, and each toothed sector ends with a corresponding stop defining an angular position of maximum opening of the first and second arms; and a linear actuator configured to regulate opening and closing movement of the first and second arms, wherein the linear actuator comprises a sleeve connected to the first arm and a stem connected to the second arm by means of a support, and having a power input adapted to be releasably connected to a power line of a station of a bartender system;

wherein the gripping mechanism is lockable to a known robotic arm to carry out bartender operations in an automated manner.

2. The robotic arm according to claim 1, wherein the first arm and the second arm each comprise at least one straight segment defining a gripping profile for holding a kitchen article when the gripping mechanism is closed; and the straight segment carrying a layer of a friction material to facilitate a grip of the kitchen article.

3. The robotic arm according to claim 2, wherein the straight segment is perpendicular to a direction of movement of the linear actuator in use during a clamping of the kitchen article.

4. The robotic arm according to claim 1, wherein the first and second arms are configured to define, in a closed position of the gripping mechanism, a hole for a stem of a goblet.

5. The robotic arm according to claim 1, further comprising a container for processing edible liquids.

6. The robotic arm according to claim 5, wherein the gripping mechanism faces a bottom of the container.

7. The robotic arm according to claim 5, comprising a cover implemented to seal the container.

8. The robotic arm according to claim 1, wherein the linear actuator is mounted on a bracket interposed between the linear actuator and the first and second arms, the gripping mechanism being configured, wherein the linear actuator faces downwards when a container on board is full, the bracket protecting the linear actuator from drops of edible liquid leaking from the container in use.

9. A method of mounting a gripping mechanism for kitchen articles containing a beverage, wherein the gripping mechanism comprises:

a first arm and a second arm movable respectively between an opening and a closing position of the first and second arms;

the first and second arms being hinged and comprising respective toothed sectors meshing and rotating around corresponding hinge axes of the first and second arms, and each toothed sector ends with a corresponding stop defining an angular position of maximum opening of the first and second arms; and a linear actuator configured to regulate opening and closing movement of the first and second arms, wherein the linear actuator comprises a sleeve connected to the first arm and a stem connected to the second arm by means of a support, and having a power input adapted to be releasably connected to a power line of a station of a bartender system;

wherein the gripping mechanism is lockable to a known robotic arm to perform bartender operations in an automated manner;

wherein the method comprises a step of applying the gripping mechanism to an end portion of the robotic arm and of functionally connecting the linear actuator to an energy source.

* * * * *